United States Patent
Lee

(10) Patent No.: US 11,960,733 B2
(45) Date of Patent: Apr. 16, 2024

(54) MEMORY CONTROLLER AND METHOD OF OPERATING THE SAME

(71) Applicant: SK hynix Inc., Gyeonggi-do (KR)

(72) Inventor: Jae Il Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/950,317

(22) Filed: Sep. 22, 2022

(65) Prior Publication Data
US 2023/0305714 A1    Sep. 28, 2023

(30) Foreign Application Priority Data
Mar. 25, 2022   (KR) .................. 10-2022-0037609

(51) Int. Cl.
*G06F 3/06*    (2006.01)

(52) U.S. Cl.
CPC .......... *G06F 3/0619* (2013.01); *G06F 3/0658* (2013.01); *G06F 3/0679* (2013.01)

(58) Field of Classification Search
CPC .... G06F 3/0619; G06F 3/0658; G06F 3/0679; G06F 3/0656; G06F 3/0659; G06F 11/1441; G06F 3/0688
See application file for complete search history.

(56) References Cited

U.S. PATENT DOCUMENTS

| | | | |
|---|---|---|---|
| 2018/0101500 A1* | 4/2018 | Heyd | G06F 13/4022 |
| 2020/0034081 A1* | 1/2020 | Lee | G06F 3/0673 |
| 2020/0301780 A1* | 9/2020 | Kim | G06F 11/108 |

FOREIGN PATENT DOCUMENTS

| | | |
|---|---|---|
| KR | 10-2010-0133649 A | 12/2010 |
| KR | 10-2020-0124070 A | 11/2020 |

* cited by examiner

*Primary Examiner* — Jason W Blust
(74) *Attorney, Agent, or Firm* — IP & T GROUP LLP

(57) ABSTRACT

Provided herein may be a memory controller and a method of operating the same. The memory controller may include a plurality of control cores configured to control a plurality of memory devices, respectively, a host core configured to allocate write requests received from a host to each of the plurality of control cores based on predefined criteria, and a shared memory configured to be accessed by the host core and the plurality of control cores, wherein, in response to occurrence of a sudden power-off, the host core is further configured to store, in the shared memory, dump information including information about logical addresses corresponding to the write requests, and wherein a first control core is further configured to store, in a memory device controlled by the first control core, the dump information of a second control core associated with the first control core.

19 Claims, 14 Drawing Sheets

|    | S_1              | S_2              | S_3                 | S_4                 |
|----|------------------|------------------|---------------------|---------------------|
| F1 | LBA 1            | LBA 2            | LBA 3               | LBA 4               |
| F2 | LBA 5<br>LBA 6<br>LBA 7 | LBA 8<br>LBA 9<br>LBA 10 | LBA 11<br>LBA 12<br>LBA 13 | LBA 13<br>LBA 14<br>LBA 15 |
| F3 | LBA 16<br>LBA 17 | LBA 18<br>LBA 19 | LBA 20<br>LBA 21    | LBA 22<br>LBA 23    |
| F4 | LBA 24           | LBA 25           | LBA 26              | LBA 27              |

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2022-0037609, filed on Mar. 25, 2022, the entire disclosure of which is incorporated herein by reference.

BACKGROUND

Field of Invention

Various embodiments of the present disclosure generally relate to an electronic device, and more particularly to a memory controller and a method of operating the memory controller.

Description of Related Art

A memory system is a device which stores data under the control of a host device such as a computer or a smartphone. When a sudden power-off (SPO) occurs, in which main power supplied to a memory system is interrupted, data that is not stored in a nonvolatile memory device may be lost. When a sudden power-off occurs, the memory system is supplied with power through an auxiliary power supply for a certain period of time. In this case, while auxiliary power is supplied, the memory system should store all data in a nonvolatile memory device in order to prevent loss of data. However, because control cores included in the memory system may differ with respect to performance, not all data may be stored in the nonvolatile memory device during the supply of auxiliary power. Further, when there is a malfunctioning control core, data allocated to the malfunctioning control core may be lost. Therefore, a scheme capable of storing all data in a nonvolatile memory device in a sudden power-off situation may be required.

SUMMARY

Various embodiments of the present disclosure are directed to a memory controller that is capable of preventing data loss in a sudden power-off situation and a method of operating the memory controller.

An embodiment of the present disclosure may provide for a memory controller. The memory controller may include a plurality of control cores configured to control a plurality of memory devices, respectively, a host core configured to allocate write requests received from a host to each of the plurality of control cores based on predefined criteria, and a shared memory configured to be accessed by the host core and the plurality of control cores, wherein the host core is further configured to store, in the shared memory in response to occurrence of a sudden power-off, dump information including information about logical addresses corresponding to the write requests, and wherein a first control core is further configured to store, in a memory device controlled by the first control core, the dump information of a second control core associated with the first control core in response to occurrence of the sudden power-off, the first and second control cores being among the plurality of control cores.

An embodiment of the present disclosure may provide for a method of operating a memory controller, the memory controller including a plurality of control cores for individually controlling a plurality of memory devices. The method may include allocating write requests received from a host to each of the plurality of control cores based on predefined criteria, storing, in a shared memory in response to occurrence of a sudden power-off, dump information including information about logical addresses corresponding to the write requests, and storing, in a memory device controlled by a first control core, the dump information of a second control core associated with the first control core in response to occurrence of the sudden power-off, the first and second control cores being among the plurality of control cores.

An embodiment of the present disclosure may provide for a memory controller. The memory controller may include a plurality of control cores configured to individually control a plurality of memory devices, a host core configured to allocate write requests received from a host to each of the plurality of control cores based on predefined criteria, and a shared memory configured to be accessed by the host core and the plurality of control cores, wherein, in response to occurrence of a sudden power-off, the host core stores dump information including information about logical addresses corresponding to the write requests in the shared memory, and each of the plurality of control cores stores data corresponding to allocated write requests and dump information of paired control cores respectively associated with the plurality of control cores in the plurality of memory devices.

An embodiment of the present disclosure may provide for a method of system including first and second sub-systems. The method may include managing a table of information representing one or more logical addresses corresponding to each of one or more operation sequences allocated to be processed by each of the first and second sub-systems, the managing including removing, from the table whenever each of the allocated operation sequences are process-completed by the first or second sub-system, the information of the process-completed operation sequence, storing, into the first sub-system while an auxiliary power is provided to the system due to a sudden power off of the system, the logical addresses corresponding to one or more pending operation sequences remaining in the table and not yet process-completed by the second sub-system, and reporting the stored logical addresses during recovery of the sudden power off.

BRIEF DESCRIPTION OF THE DRAWINGS

FIG. 5 is a diagram illustrating a dump information storage according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
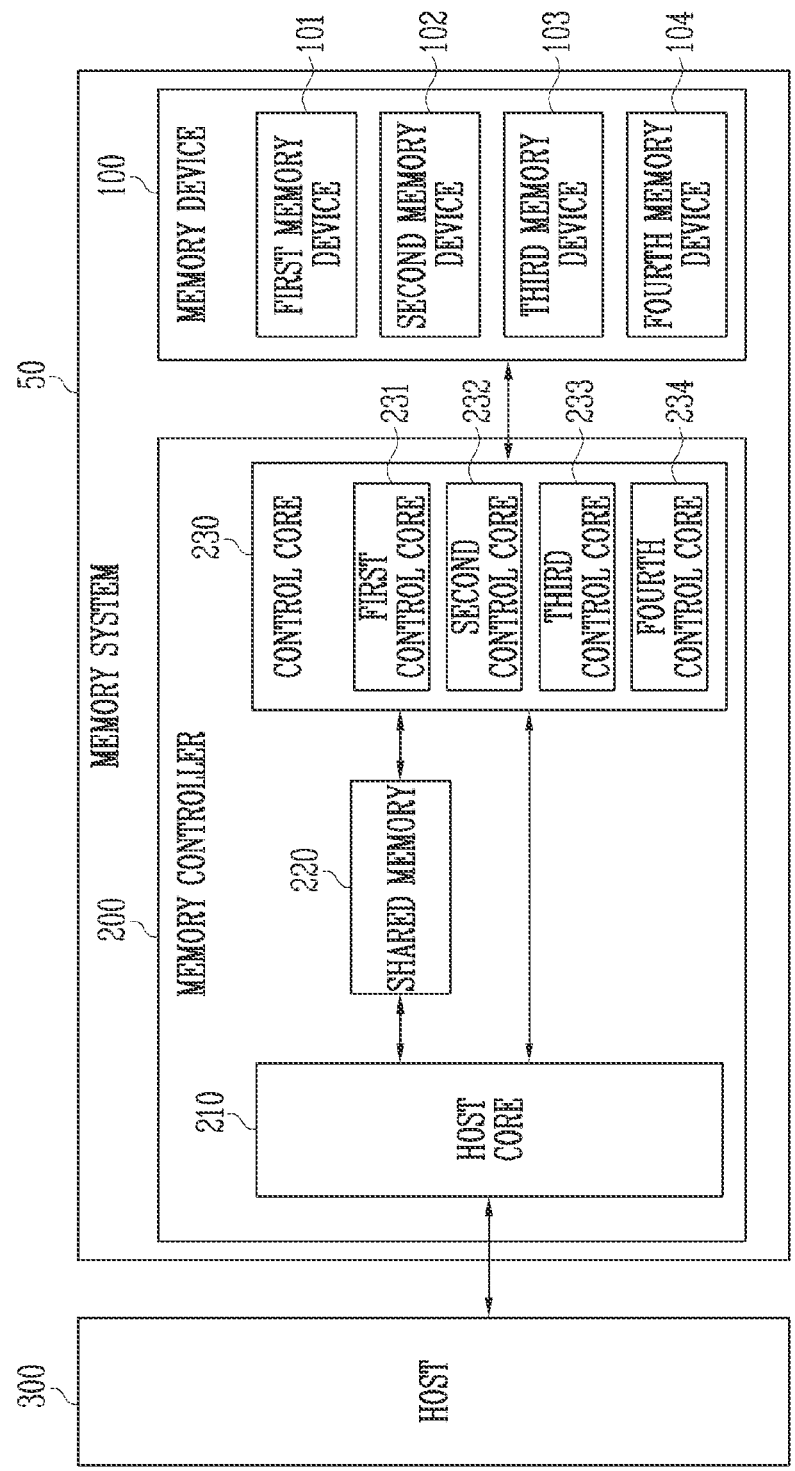
FIG. 1 is a diagram illustrating a memory system including a memory controller according to an embodiment of the present disclosure.

FIG. 1 is a diagram illustrating a memory system including a memory controller according to an embodiment of the present disclosure.

Referring to FIG. 1, a memory system 50 may include a memory device 100 and a memory controller 200. The memory system 50 may be a device which stores data under the control of a host 300, such as a mobile phone, a smartphone, an MP3 player, a laptop computer, a desktop computer, a game console, a TV, a tablet PC, or an in-vehicle infotainment system.

The memory system 50 may be manufactured as one of various types of storage devices depending on a host interface that is a scheme for communication with the host 300. For example, the memory system 50 may be implemented as one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The memory system 50 may be manufactured in one of various types of package forms. For example, the memory system 50 may be manufactured in one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated under the control of the memory controller 200. The memory device 100 may include a memory cell array (not illustrated) including a plurality of memory cells which store data.

Each of the memory cells may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The memory cell array (not illustrated) may include a plurality of memory blocks. Each memory block may include a plurality of memory cells. One memory block may include a plurality of pages. In an embodiment, a page may be the unit by which data is stored in the memory device 100 or the unit by which data stored in the memory device 100 is read. A memory block may be the unit by which data is erased.

In an embodiment, the memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description is made based on that the memory device 100 is a NAND flash memory.

The memory device 100 may receive a command and an address from the memory controller 200, and may access the area of the memory cell array, selected by the address. The memory device 100 may perform an operation indicated by the command on the area selected by the address. For example, the memory device 100 may perform a write operation (i.e., a program operation), a read operation, and an erase operation. During a write operation, the memory device 100 may program data to the area selected by the address. During a read operation, the memory device 100 may read data from the area selected by the address. During an erase operation, the memory device 100 may erase data stored in the area selected by the address.

The memory device 100 may be composed of a plurality of memory devices. In an embodiment, the memory device 100 may include first to fourth memory devices 101, 102, 103, and 104. Although, in FIG. 1, the case where the number of memory devices is 4 is illustrated, the memory device 100 may include five or more memory devices. Each of the memory devices may include a plurality of memory chips.

The memory controller 200 may control the overall operation of the memory system 50.

When power is applied to the memory system 50, the memory controller 200 may run firmware (FW). When the memory device 100 is a flash memory device, the firmware (FW) may include a host interface layer (HIL) which controls communication with the host 300, a flash translation layer (FTL) which controls communication between the host 300 and the memory device 100, and a flash interface layer (FIL) which controls communication with the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored. In the present specification, the terms "logical block address (LBA)" and "logical address" may be used interchangeably. In the present specification, the physical block address (PBA) and "physical address" may be used interchangeably.

The memory controller 200 may control the memory device 100 so that a write operation, a read operation or an erase operation is performed in response to a request received from the host 300. During a write operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may internally generate a command, an address, and data regardless of whether a request from the host 300 is received, and may transmit them to the memory device 100. For example, the memory controller 200 may provide the memory device 100 with commands, addresses, and data required in order to perform read operations and write operations that are involved in performing wear leveling, read reclaim, garbage collection, etc.

In an embodiment, the memory controller 200 may control two or more memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

In an embodiment, the memory controller 200 may include a host core 210, a shared memory 220, and a control core 230.

The host core 210 may receive a request from the host 300, and may provide the request to the control core 230. The control core 230 may be composed of a plurality of control cores. In detail, when a write request is received from the host 300, the host core 210 may provide a logical address and write data, which correspond to the write request, to the control core 230. In an embodiment, the host core 210 may provide the logical address and the write data, which correspond to the write request, to the shared memory 220. When a read request is received from the host 300, the host core 210 may provide a logical address corresponding to the read request to the control core 230.

In an embodiment, the host core 210 may allocate the requests received from the host 300 to each of the plurality of control cores based on predefined criteria. In an example, the host core 210 may allocate the requests to each of the plurality of control cores sequentially. In an example, the host core 210 may allocate the requests depending on the respective operation speeds of the plurality of control cores. The host core 210 may additionally allocate requests to the control core which completes processing of a primarily provided request, among the plurality of control cores.

The shared memory 220 may temporarily store data provided from the host 300, or may temporarily store data read from the memory device 100. In an embodiment, the shared memory 220 may be a volatile memory device. For example, the shared memory 220 may be a dynamic random access memory (DRAM) or a static random access memory (SRAM).

In an embodiment, the shared memory 220 may store dump information including information about logical addresses corresponding to requests. The shared memory 220 may store milestone information indicating the processing states of the requests allocated to each of the plurality of control cores.

The control core 230 may control the overall operation of the memory controller 200. The control core 230 may perform operations required to access the memory device 100. For example, the control core 230 may provide a command to the memory device 100, and may control the memory device 100 to perform an operation corresponding to the command. For example, the control core 230 may translate logical addresses corresponding to the requests received from the host core 210 into physical addresses. The control core 230 may be composed of a plurality of control cores. In an embodiment, the control core 230 may be composed of first to fourth control cores 231, 232, 233, and 234. However, the control core 230 may be composed of five or more control cores.

Each of the plurality of control cores may control the operation of each of the plurality of memory devices. In an embodiment, the first control core 231 may control the operation of the first memory device 101. The second control core 232 may control the operation of the second memory device 102. In an embodiment, the first control core 231 may control the operations of the first memory device 101 and the second memory device 102.

Each of the plurality of control cores may process a write request allocated by the host core 210, and may then identify the milestone information of a paired control core associated with each of the plurality of control cores. For example, the first control core 231 may store data corresponding to allocated write requests in the first memory device, and thereafter may identify the milestone information of the second control core 232. Here, the second control core 232 may be a control core paired with the first control core 231. Alternatively, control cores paired with the first control core 231 may be the second control core 232 and the third control core 233. The first control core 231 and the second control core 232 may identify each other's milestone information stored in the shared memory 220. In an embodiment, the first control core 231 may be a control core to which write requests are less frequently allocated than the second control core 232. In an embodiment, the first control core 231 may be a control core that processes the allocated write requests at a higher operation speed than the second control core 232.

The host 300 may communicate with the memory system 50 using at least one of various communication standards or interfaces such as universal serial bus (USB), Serial AT Attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
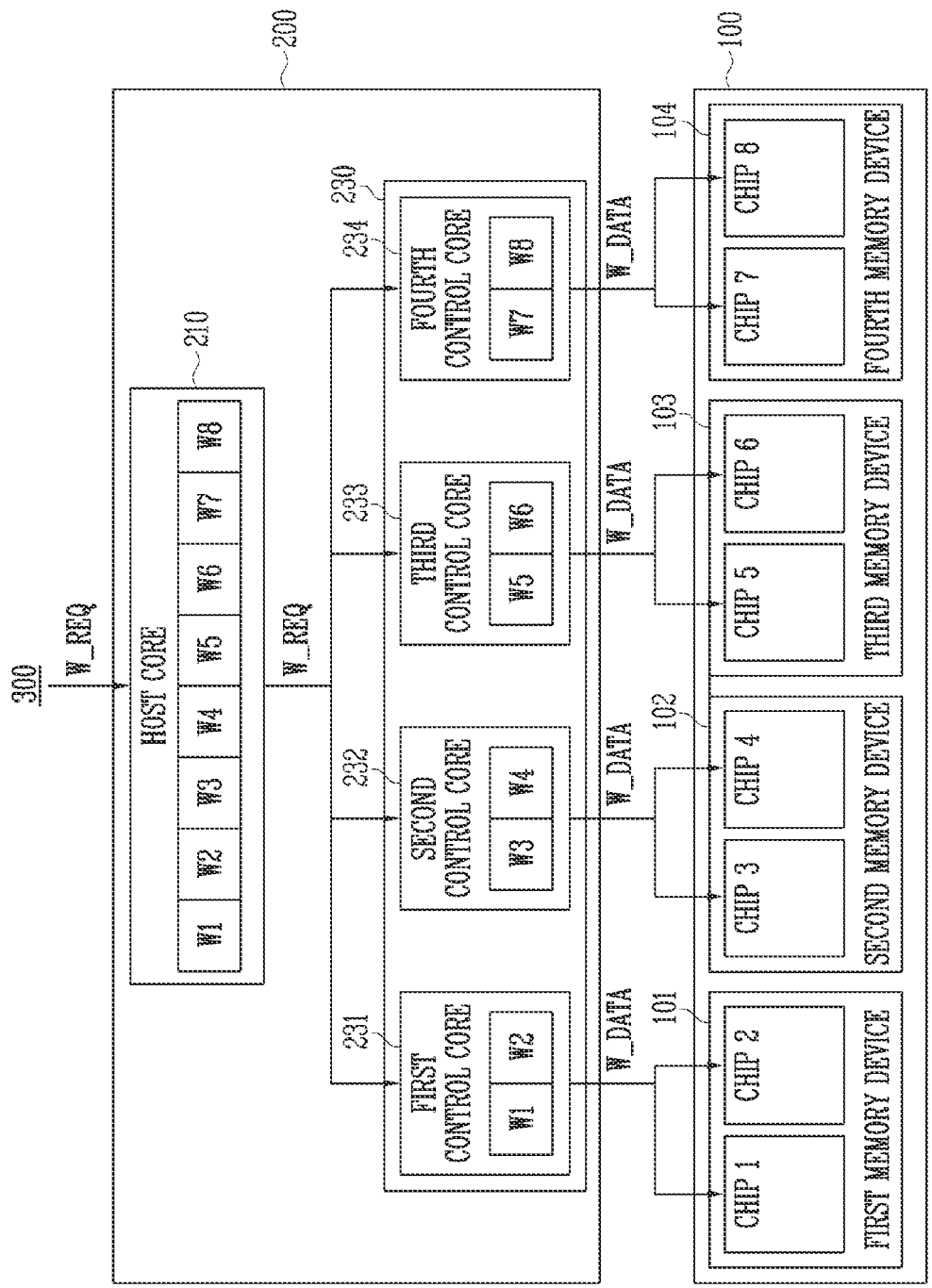
FIG. 2 is a diagram illustrating the operation of a memory system in a sudden power-off situation according to an embodiment of the present disclosure.

FIG. 2 is a diagram illustrating the operation of a memory system in a sudden power-off situation according to an embodiment of the present disclosure.

A sudden power-off may be the situation in which the main power supplied to the memory system 50 is suddenly interrupted. In the event of a sudden power-off, the memory system 50 may maintain the supply of power through an auxiliary power supply for a certain period of time. Here, the control core 230 may perform a dump operation of storing data corresponding to write requests W_REQ from the host 300 in the memory device 100 during the supply of auxiliary power.

Referring to FIG. 2, the host core 210 may receive write requests W_REQ from the host 300. For example, as illustrated in FIG. 2, the host core 210 may receive first to eighth write requests W1 to W8 from the host 300. The host core 210 may allocate the write requests W_REQ to each of the first to fourth control cores 231, 232, 233, and 234. For example, the host core 210 may sequentially allocate the first to eighth write requests W1 to W8 to the first to fourth control cores 231, 232, 233, and 234. More specifically, the host core 210 may allocate the first and second write requests W1 and W2 to the first control core 231. The host core 210 may allocate the third and fourth write requests W3 and W4 to the second control core 232. The host core 210 may allocate the fifth and sixth write requests W5 and W6 to the third control core 233. The host core 210 may allocate the seventh and eighth write requests W7 and W8 to the fourth control core 234.

Thereafter, the first to fourth control cores 231, 232, 233, and 234 may read data W_DATA corresponding to the allocated write requests from the shared memory 220. The first to fourth control cores 231, 232, 233, and 234 may control the first to fourth memory devices 101, 102, 103, and 104 so that the data W_DATA corresponding to the allocated write requests is stored in the first to fourth memory devices 101, 102, 103, and 104. For example, the first control core 231 may control the first memory device 101 so that data W_DATA corresponding to the first and second write requests is stored in the first memory device 101. The first memory device 101 may include a first memory chip CHIP 1 and a second memory chip CHIP 2. The data W_DATA corresponding to the first and second write requests may be stored in the first memory chip CHIP 1 and the second memory chip CHIP 2.

In a sudden power-off situation, the memory system 50 should be able to store data W_DATA corresponding to write requests in the memory device 100 before auxiliary power is turned off. That is, data that is not stored in the memory device 100 may be lost. In an example, in a sudden power-off situation, when one of the plurality of control cores is not normally operated, data W_DATA corresponding to the write requests allocated to the one control core may be lost. In an example, when the operation speed of a control core is low, not all data corresponding to the allocated write requests may be stored during the supply of auxiliary power. Therefore, a scheme capable of preventing the loss of data in a sudden power-off situation may be required.

Figure 3:
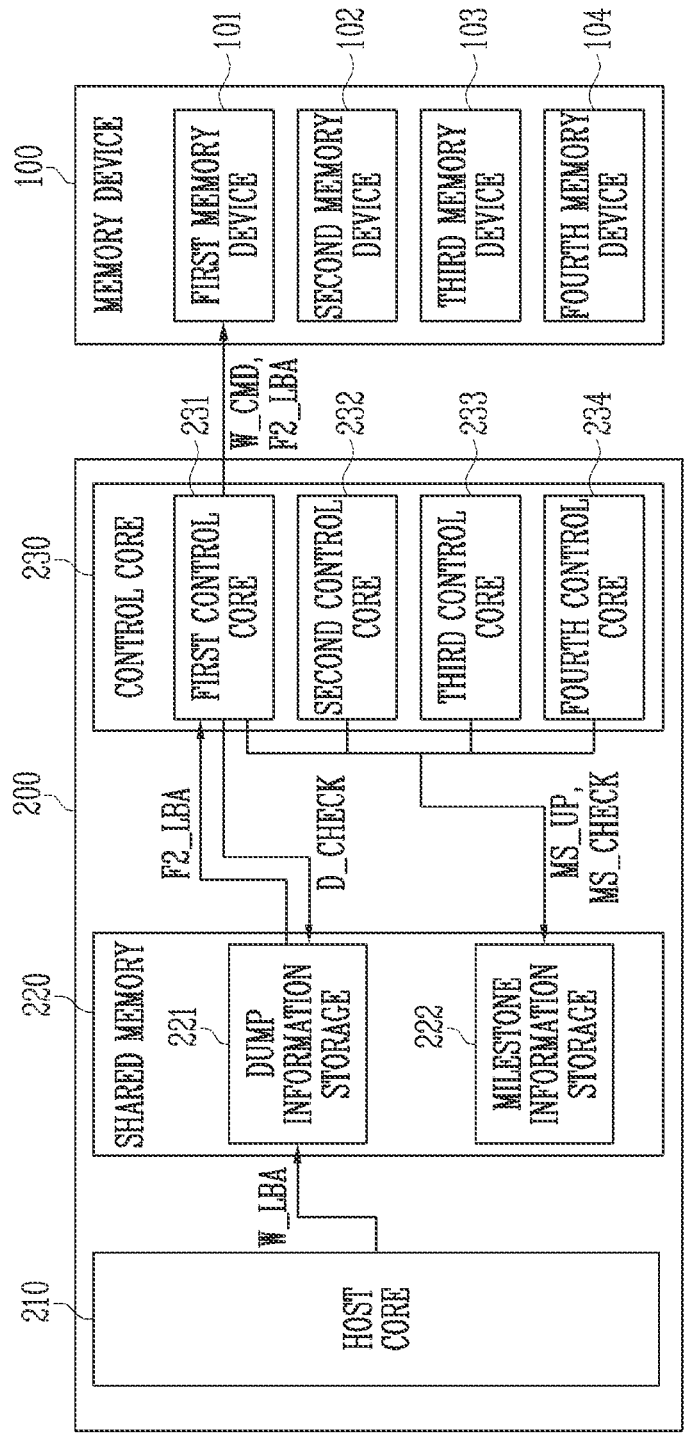
FIG. 3 is a diagram illustrating the operation of a memory system in a sudden power-off situation according to an embodiment of the present disclosure.

FIG. 3 is a diagram illustrating the operation of a memory system in a sudden power-off situation according to an embodiment of the present disclosure.

Referring to FIG. 3, the memory controller 200 may include a host core 210, a shared memory 220, and a control core 230. The shared memory 220 may include a dump information storage 221 and a milestone information storage 222. The dump information storage 221 may store dump information W_LBA including information about logical addresses corresponding to write requests allocated to the control core 230. The milestone information storage 222 may store milestone information indicating the processing states of the write requests allocated to the control core 230.

The host core 210 may store dump information, including the information about the logical addresses corresponding to the allocated write requests, in the dump information storage 221 in response to the occurrence of a sudden power-off. The control core 230 may control the memory device 100 to store the data corresponding to the allocated write requests in the memory device 100. For example, referring to FIG. 2, the first control core 231 may control the first memory device 101 so that data corresponding to the first and second write requests is stored in the first memory device 101. Thereafter, the first control core 231 may update existing milestone information to milestone information indicating that processing of the allocated write requests has been completed (MS_UP). Further, the first control core 231 may identify the milestone information of the second control core 232 (MS_CHECK). The second control core 232 may be a control core paired with the first control core 231. The first control core 231 may store the dump information of the second control core in the first memory device 101 controlled by the first control core 231 based on the milestone information of the second control core. For example, unless the milestone information of the second control core 232 is updated to milestone information indicating that processing of the write requests has been completed, the first control core 231 may control the first memory device 101 so that dump information F2_LBA of the second control core is stored in the first memory device 101. In detail, after identifying the milestone information of the second control core 232 stored in the milestone information storage 222, the first control core 231 may identify the dump information of the second control core 232 from the dump information storage 221 (D_CHECK) unless the milestone information of the second control core 232 is updated. Further, the first control core 231 may read the dump information F2_LBA of the second control core from the dump information storage 221. Thereafter, the first control core 231 may store the dump information F2_LBA of the second control core in the first memory device 101.

Unlike the configuration illustrated in FIG. 3, when processing of the write requests allocated to the second control core 232 is completed, the second control core 232 may identify the milestone information of the first control core 231 (MS_CHECK). Unless the milestone information of the first control core 231 is updated, the second control core 232 may read the dump information of the first control core 231 from the dump information storage, and may store the read dump information in the second memory device 102 controlled by the second control core 232.

Any one of the plurality of control cores may identify the milestone information of a paired control core associated with the one control core. Alternatively, the control core paired with the one control core may identify the milestone information of the one control core. That is, any one control core and the control core paired therewith may identify each other's milestone information. In an example, a control core paired with the first control core 231 may be the second control core 232. In an example, the control cores paired with the first control core 231 may be the second control core 232 and the third control core 233. That is, any one control core and one or more control cores paired therewith may identify each other's milestone information.

Figure 4:
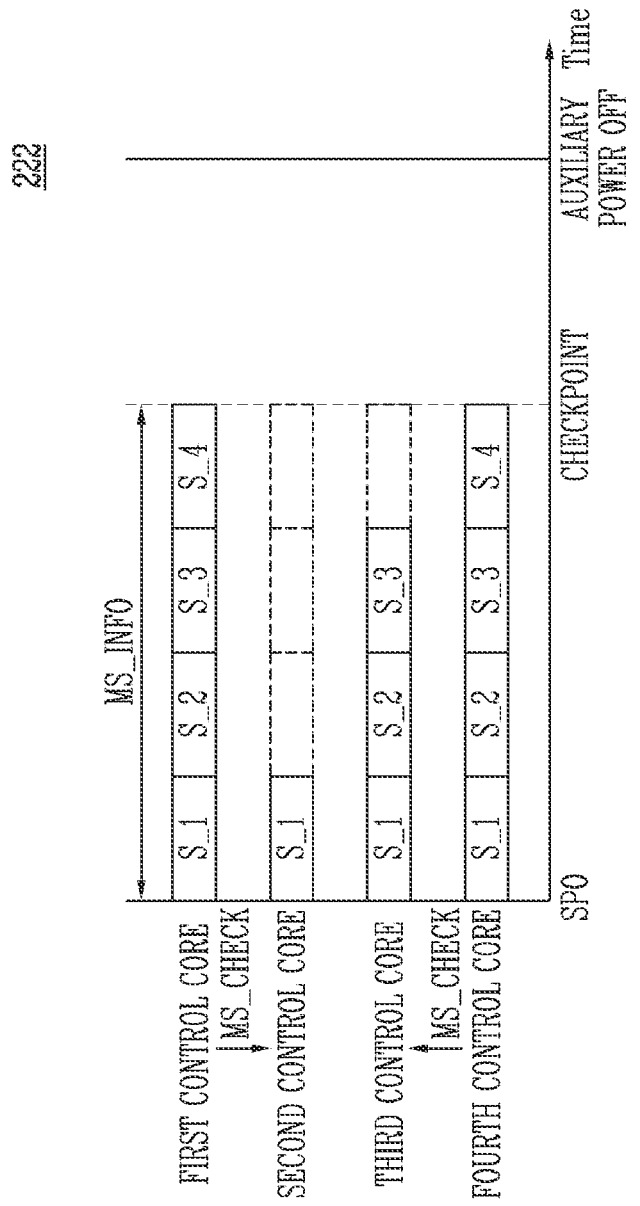
FIG. 4 is a diagram illustrating a milestone information storage according to an embodiment of the present disclosure.

FIG. 4 is a diagram illustrating a milestone information storage according to an embodiment of the present disclosure.

Referring to FIG. 4, the milestone information storage 222 may store milestone information MS_INFO indicating the processing states of the write requests allocated to each of the plurality of control cores. The milestone information MS_INFO may be stored for each of the plurality of control cores. The milestone information MS_INFO may include a plurality of sequences S_1 to S_4 indicating the extents to which the write requests allocated to each of the plurality of control cores are processed. For example, any one of the plurality of control cores may update the milestone information MS_INFO whenever some of the allocated write requests are completed. The one control core may update the milestone information thereof whenever each of the plurality of sequences is completed. In FIG. 4, although the write requests to be processed by the plurality of control cores are illustrated as being divided into first to fourth sequences S_1 to S_4, the present disclosure is not limited thereto.

In an embodiment, the first control core 231 may store data corresponding to the allocated write requests in the first memory device 101 in response to the occurrence of a sudden power-off. The allocated write requests may include first to fourth sequences S_1 to S_4. The first control core 231 may update milestone information whenever processing of some of the allocated write requests is completed. After processing the allocated write requests has been completed, the first control core 231 may identify the milestone information of the second control core (MS CHECK) at a checkpoint, which is a time point after a preset time has elapsed from the occurrence of a sudden power-off. The control core paired with the first control core 231 may be a second control core 232. Here, the second control core 232 may be in a state in which only write requests corresponding to the first sequence S_1, among the allocated write requests, are processed. That is, the second control core 232 may be in a state in which processing of the write requests corresponding to the second to fourth sequences S_2 to S_4 is not yet completed. Here, the first control core 231 may read dump information of the second control core corresponding to the second to fourth sequences S_2 to S_4, which are not yet processed by the second control core 232, from the dump information storage 221. Furthermore, the first control core 231 may store the dump information of the second control core corresponding to the second to fourth sequences S_2 to S_4 in the first memory device 101.

In an embodiment, the fourth control core 234 may store data corresponding to the allocated write requests in the fourth memory device 104 in response to the occurrence of a sudden power-off. After processing the allocated write requests has been completed, the fourth control core 234 may identify the milestone information of the third control core (MS CHECK) at a checkpoint, which is a time point after a preset time has elapsed from the occurrence of a sudden power-off. The control core paired with the fourth control core 234 may be a third control core 233. Here, the third control core 233 may be in a state in which only write requests corresponding to the first to third sequences S_1 to S_3, among the allocated write requests, are processed. That is, the third control core 233 may be in a state in which processing of the write requests corresponding to the fourth sequence S_4 is not yet completed. Here, the fourth control core 234 may read dump information of the third control core corresponding to the fourth sequence S_4, which is not yet processed by the third control core 233, from the dump information storage 221. Furthermore, the fourth control core 234 may store the dump information of the fourth control core corresponding to the fourth sequence S_4 in the fourth memory device 104.

In an embodiment, the checkpoint, which is a time point after the preset time has elapsed from the occurrence of a sudden power-off, may be the time point at which processing of write requests allocated to each of the plurality of control cores has been completed. The time point at which processing of the allocated write requests has been completed may be the time point at which data corresponding to the allocated write requests is stored in the corresponding memory device. However, among the plurality of control cores, some control cores are not normally operated and are incapable of processing all of the allocated write requests before the checkpoint. Accordingly, any one control core identifies the milestone information of the control core paired therewith, thus storing dump information corresponding to the write requests that are not processed by the paired control core in the memory device controlled by the one control core.

Moreover, because auxiliary power is supplied in response to the occurrence of a sudden power-off, the plurality of control cores should be able to store data corresponding to the allocated write requests in the plurality of memory devices before an auxiliary power supply is turned off. Furthermore, because the time at which the auxiliary power supply is turned off varies with the amount of charge stored in a capacitor, a time point corresponding to the checkpoint should be able to change as the time at which the auxiliary power supply is turned off varies. The checkpoint, which is the time point at which one control core identifies the milestone information of a control core paired therewith, should appear before the time point at which the auxiliary power supply is turned off.

FIG. 5 is a diagram illustrating a dump information storage according to an embodiment of the present disclosure.

Referring to FIG. 5, the dump information storage 221 may store dump information corresponding to each of a plurality of sequences S_1 to S_4. As illustrated in FIG. 5, the numbers of write requests allocated to first to fourth control cores F1 to F4 may be equal to or different from each other. For example, because first to fourth write requests are allocated to the first control core F1, the dump information storage 221 may store dump information including information about first to fourth logical addresses LBA1 to LBA4. Because fifth to 15th write requests are allocated to the second control core F2, the dump information storage 221 may store dump information including information about fifth to 15th logical addresses LBA5 to LBA15. Further, because 16th to 23rd write requests are allocated to the third control core F3, the dump information storage 221 may store dump information including information about 16th to 23rd logical addresses LBA16 to LBA23. Furthermore, because 24th to 27th write requests are allocated to the fourth control core F4, the dump information storage 221 may store dump information including information about 24th to 27th logical addresses LBA24 to LBA27.

The dump information storage 221 may store the dump information so that pieces of dump information of the plurality of control cores are separated into a plurality of sequences. The dump information of the first control core may be stored as one logical address related to one sequence. For example, the first sequence S_1 of the first control core F1 may be related to a first logical address LBA1. The dump information of the second control core may be stored as three logical addresses related to one sequence. For example, the first sequence S_1 of the second control core F2 may be related to fifth to seventh logical addresses LBA5 to LBA7. The dump information of the third control core may be stored as two logical addresses related to one sequence. For example, the first sequence S_1 of the third control core F3 may be related to 16th and 17th logical addresses LBA16 and LBA17.

The dump information storage 221 may store dump information so that the number of logical addresses included in one sequence differs depending on the number of write requests allocated to each of the plurality of control cores.

Figure 6:
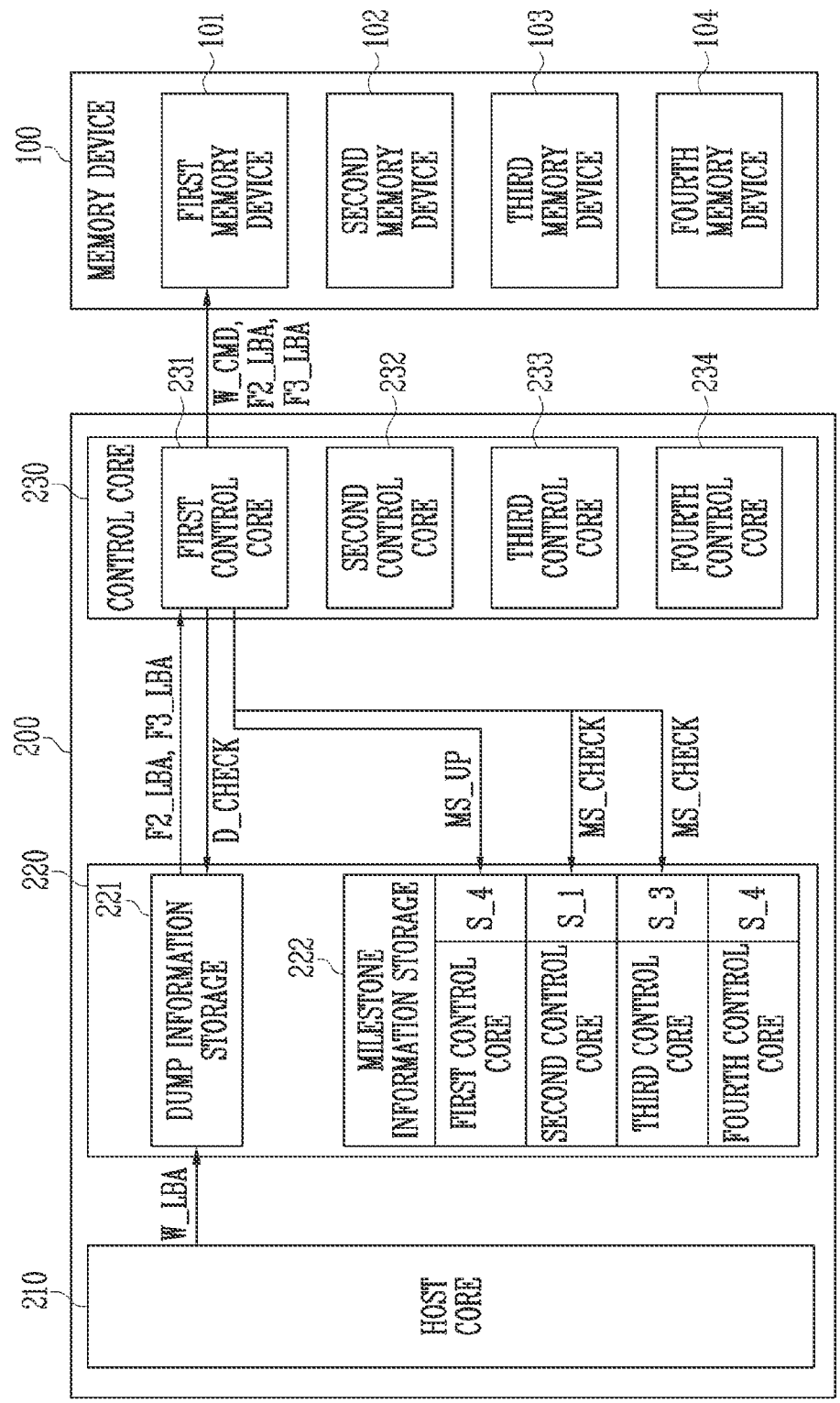
FIG. 6 is a diagram illustrating the operation of a memory system in a sudden power-off situation according to an embodiment of the present disclosure.

FIG. 6 is a diagram illustrating the operation of a memory system in a sudden power-off situation according to an embodiment of the present disclosure.

Referring to FIG. 6, the memory controller 200 may include a host core 210, a shared memory 220, and a control core 230. The shared memory 220 may include a dump information storage 221 and a milestone information storage 222. The dump information storage 221 may store dump information W_LBA including information about logical addresses corresponding to write requests allocated to the control core 230. The milestone information storage 222 may store milestone information indicating the processing states of the write requests allocated to the control core 230.

The host core 210 may store dump information W_LBA, including the information about the logical addresses corresponding to the allocated write requests, in the dump information storage 221 in response to the occurrence of a sudden power-off. The control core 230 may control the memory device 100 to store the data corresponding to the allocated write requests in the memory device 100. In an embodiment, the first control core 231 may update the milestone information of the first control core 231 (MS_UP) whenever processing of the allocated write requests divided into the plurality of sequences is completed. The first control core 231 may store data corresponding to the allocated write requests in a first memory device 101, and may identify the milestone information of the second control core 232 and the third control core 233 (MS_CHECK) after a preset time has elapsed. Alternatively, the first control core 231 may identify the milestone information of the second control core 232 (MS_CHECK) and store dump information of the second control core 232 in the first memory device 101, and thereafter may identify the milestone information of the third control core 233 (MS_CHECK). The control cores paired with the first control core 231 may be the second control core 232 and the third control core 233. In an embodiment, the first control core 231 may be a control core that has a smaller number of write requests allocated thereto than the second control core 232 and the third control core 233. In an embodiment, the first control core 231 may be a control core that has a higher operation speed than the second control core 232 and the third control core 233. Here, the milestone information of the second control core 232 may be in a state in which the milestone information up to the first sequence S_1, among the plurality of sequences, is updated. Here, the second control core 232 may be in a state in which write requests corresponding to the second to fourth sequences, among the allocated write requests, are not yet processed. The milestone information of the third control core 233 may be in a state in which the milestone information up to the third sequence S_3, among the plurality of sequences, is updated. That is, the third control core may be in a state in which write requests corresponding to the fourth sequence, among the allocated write requests, are not yet processed. Accordingly, the first control core 231 may identify the milestone information of the second control core 232 and the third control core 233 (MS_CHECK), and may read the dump information of the second control core 232 and the third control core 233 from the dump information storage 221 based on the identified milestone information. More specifically, the first control core 231 may read dump information corresponding to sequences that are not yet completed, among the plurality of sequences of the second control core 232 and the third control core 233, from the dump information storage 221. For example, as illustrated in FIG. 5, the first control core 231 may read information about eighth to 15th logical addresses LBA8 to LBA15 corresponding to second to fourth sequences S_2 to S_4 of the second control core. Also, the first control core 231 may read information about 22nd and 23rd logical addresses LBA22 and LBA23 corresponding to the fourth sequence S_4 of the third control core. Thereafter, the first control core 231 may control the first memory device 101 to store dump information corresponding to uncompleted sequences of the second control core 232 and the third control core 233 in the first memory device 101.

In the present disclosure, although the case where the number of control cores paired with any one control core is one or two is described by way of example, the number of control cores paired with any one control core may be three or more. Further, in a sudden power-off situation, any one control core may identify the milestone information of a control core paired therewith, and the paired control core may also identify the milestone information of the one control core and store the dump information of the one control core in a memory device controlled by the paired control core. That is, any one control core and the control core paired therewith may identify each other's milestone information.

Figure 7:
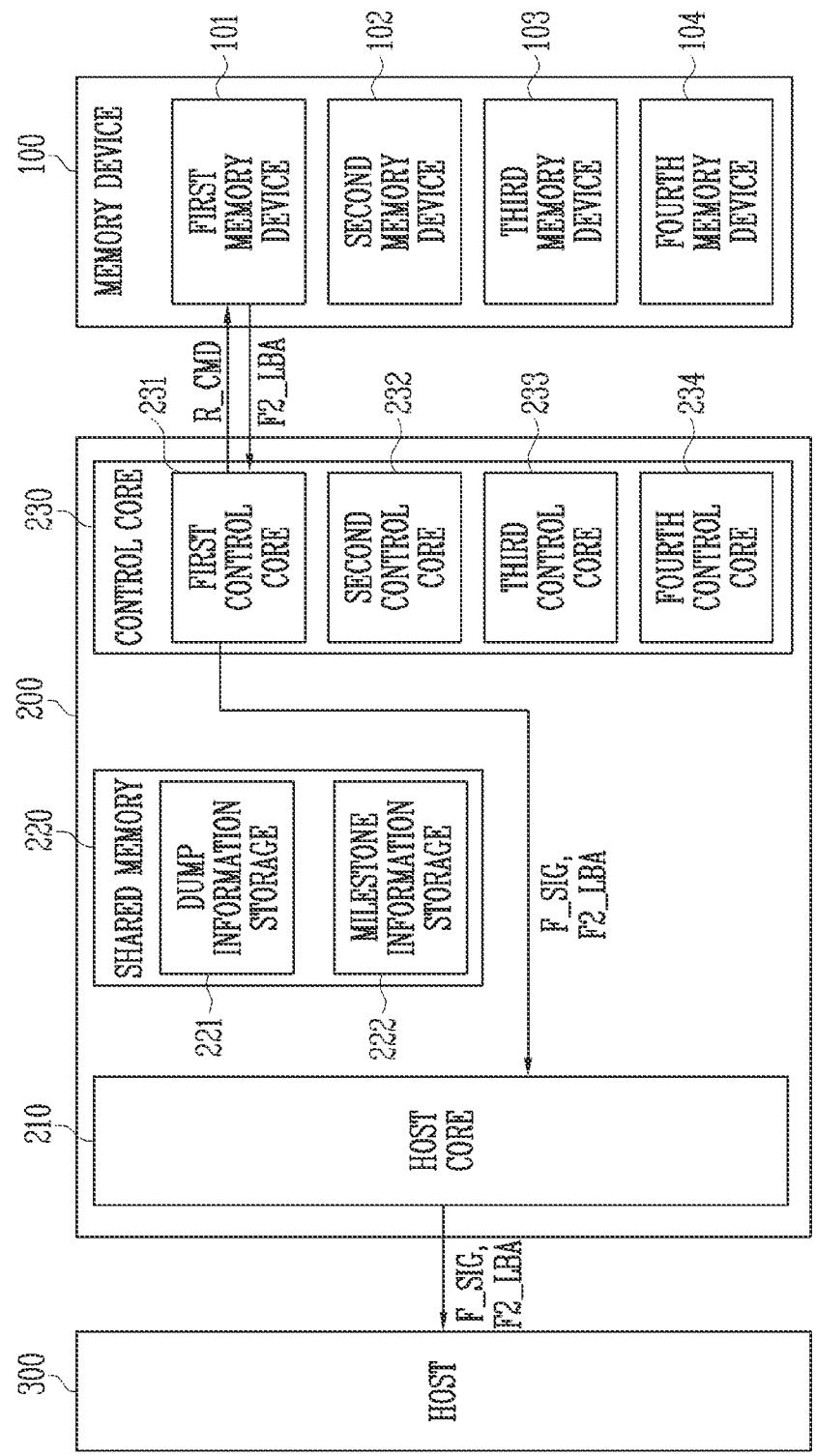
FIG. 7 is a diagram illustrating the operation of a memory system performed in response to a power-on state according to an embodiment of the present disclosure.

FIG. 7 is a diagram illustrating the operation of a memory system performed in response to a power-on state according to an embodiment of the present disclosure.

FIG. 7 illustrates an operation performed when power is turned on after a first control core 231 stores dump information F2_LBA of a second control core associated with the first control core in a first memory device 101 in response to the occurrence of a sudden power-off.

Referring to FIG. 7, the first control core 231 may read the dump information F2_LBA of the second control core stored in the first memory device 101 in response to a power-on state. Since data corresponding to write requests allocated to the second control core cannot be stored, the first control core 231 may provide the dump information F2_LBA of the second control core, together with a fail signal F_SIG indicating that the dump information of the second control core has failed, to a host core 210. Thereafter, the host core 210 may provide the fail signal and the dump information F2_LBA of the second control core to the host 300. Accordingly, the host 300 may identify the data that cannot be stored in the memory device 100 in a sudden power-off situation.

Figure 8:
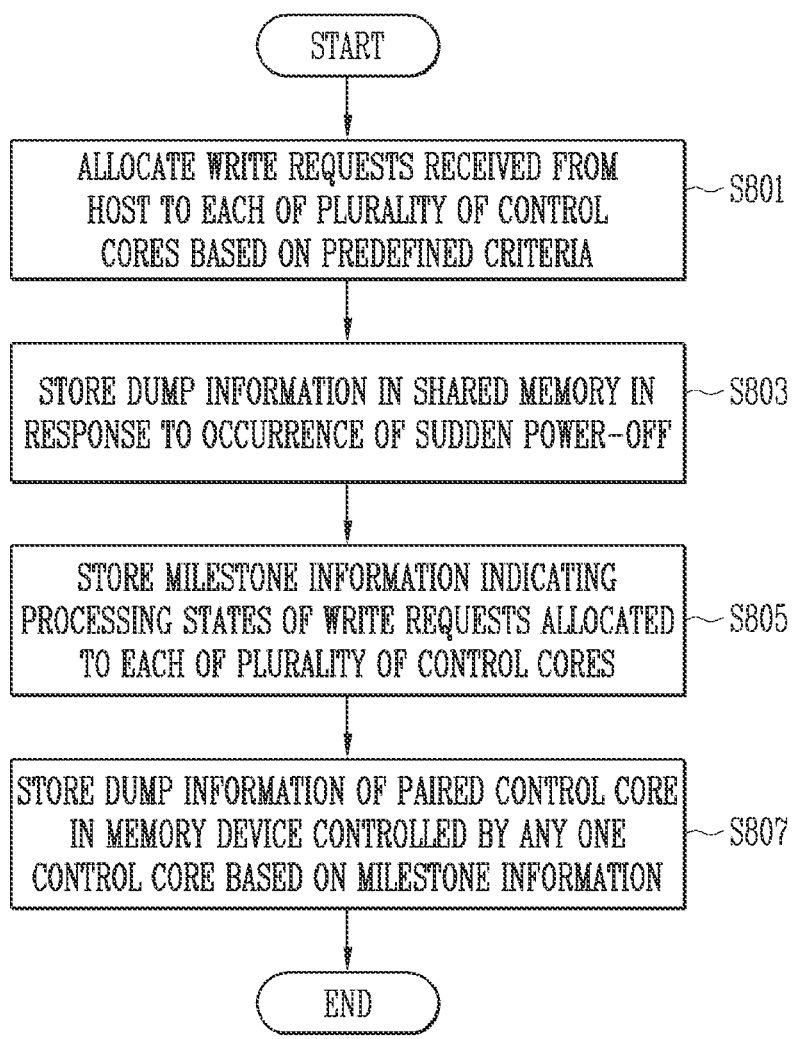
FIG. 8 is a flowchart illustrating the operation of a memory system in a sudden power-off situation according to an embodiment of the present disclosure.

FIG. 8 is a flowchart illustrating the operation of a memory system in a sudden power-off situation according to an embodiment of the present disclosure.

Referring to FIG. 8, at operation S801, a memory system 50 may allocate write requests received from a host to each of a plurality of control cores based on preset criteria. In an embodiment, a host core may sequentially allocate the allocated write requests to the plurality of control cores. In other embodiments, the host core may set the frequency with which write requests are allocated to the plurality of control cores to different values.

At operation S803, the memory system 50 may store dump information in a shared memory in response to the occurrence of a sudden power-off. The dump information may be information about logical addresses corresponding to write requests allocated to each of a plurality of control cores.

At operation S805, the memory system 50 may store milestone information indicating the processing states of the write requests allocated to each of the plurality of control cores. In an embodiment, each of the plurality of control cores may update the milestone information when processing of write requests allocated thereto is completed. In other embodiments, each of the plurality of control cores may update the milestone information whenever processing of the write requests corresponding to each of the plurality of sequences is completed.

At operation S807, the memory system 50 may store dump information of a control core paired with any one control core in a memory device controlled by the one control core based on the milestone information. The paired control core may be a control core associated with the one control core. The one control core and the control core paired therewith may identify each other's milestone information. Unless the milestone information of the paired control core is updated after a predetermined period of time has elapsed, the one control core may store the dump information of the control core paired therewith in the memory device controlled by the one control core.

Figure 9:
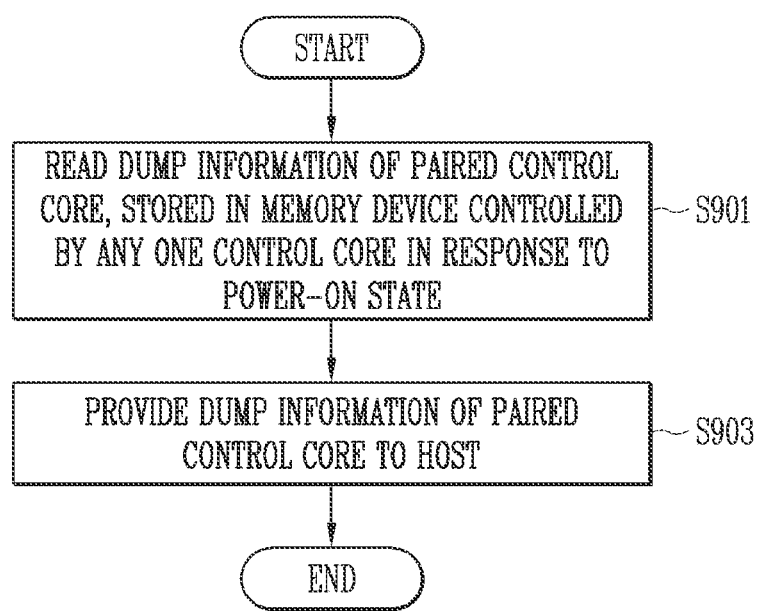
FIG. 9 is a flowchart illustrating the operation of a memory system performed in response to a power-on state according to an embodiment of the present disclosure.

FIG. 9 is a flowchart illustrating the operation of a memory system performed in response to a power-on state according to an embodiment of the present disclosure.

Referring to FIG. 9, at operation S901, the memory system 50 may read dump information of a control core paired with any one control core, stored in a memory device controlled by the one control core, in response to a power-on state.

At operation S903, the memory system 50 may provide the dump information of the paired control core to a host. The host may be provided with information about logical addresses corresponding to data that is not stored in the memory device in a sudden power-off situation.

Figure 10:
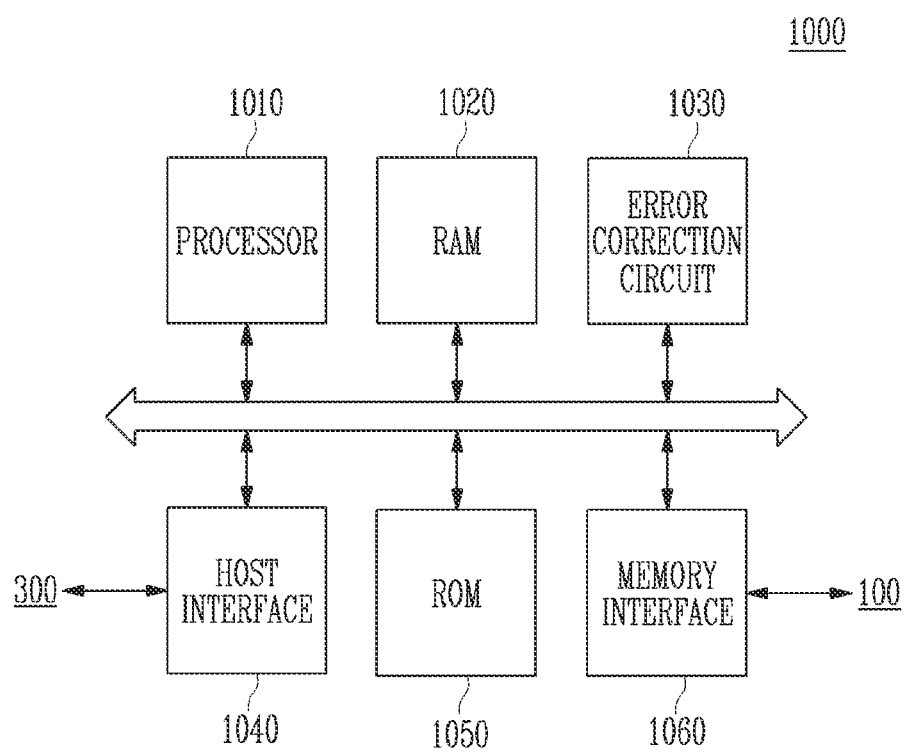
FIG. 10 is a diagram illustrating the memory controller of FIG. 1 according to an embodiment of the present disclosure.

FIG. 10 is a diagram illustrating the memory controller of FIG. 1 according to an embodiment of the present disclosure.

The memory controller 1000 of FIG. 10 may be the memory controller 200 of FIG. 1.

Referring to FIG. 10, the memory controller 1000 may include a processor 1010, a random access memory (RAM) 1020, an error correction circuit 1030, a host interface 1040, a read only memory (ROM) 1050, and a memory interface 1060.

The processor 1010 may control the overall operation of the memory controller 1000. In an embodiment, the control core 230 of FIG. 1 may be implemented as one component of the processor 1010. The processor 1010 may control the operation of the memory controller 1000 to store data requested by a host 300 in the memory device 100.

The RAM 1020 may be used as a buffer memory, a cache memory or a working memory of the memory controller 1000. In an embodiment, the RAM 1020 may store dump information and milestone information of each of a plurality of control cores.

The error correction circuit 1030 may perform error correction. The error correction circuit 1030 may perform error correction code (ECC) encoding based on data to be written to the memory device 100 through the memory interface 1060. The ECC-encoded data may be transferred to the memory device 100 through the memory interface 1060. The error correction circuit 1030 may perform error correction decoding (ECC decoding) on data received from the memory device 100 through the memory interface 1060. In an embodiment, the error correction circuit 1030 may be included, as a component of the memory interface 1060, in the memory interface 1060.

The ROM 1050 may store various types of information required for the operation of the memory controller 1000 in the form of firmware.

The memory controller 1000 may communicate with an external device (e.g., a host 300, an application processor, or the like) through the host interface 1040. The memory controller 1000 may be provided with data through the host interface 1040.

The memory controller 1000 may communicate with the memory device 100 through the memory interface 1060. The memory controller 1000 may transmit a command, an address, a control signal, etc. to the memory device 100 and receive data from the memory device 100 through the memory interface 1060. In an example, the memory interface 1060 may include a NAND interface.

Figure 11:
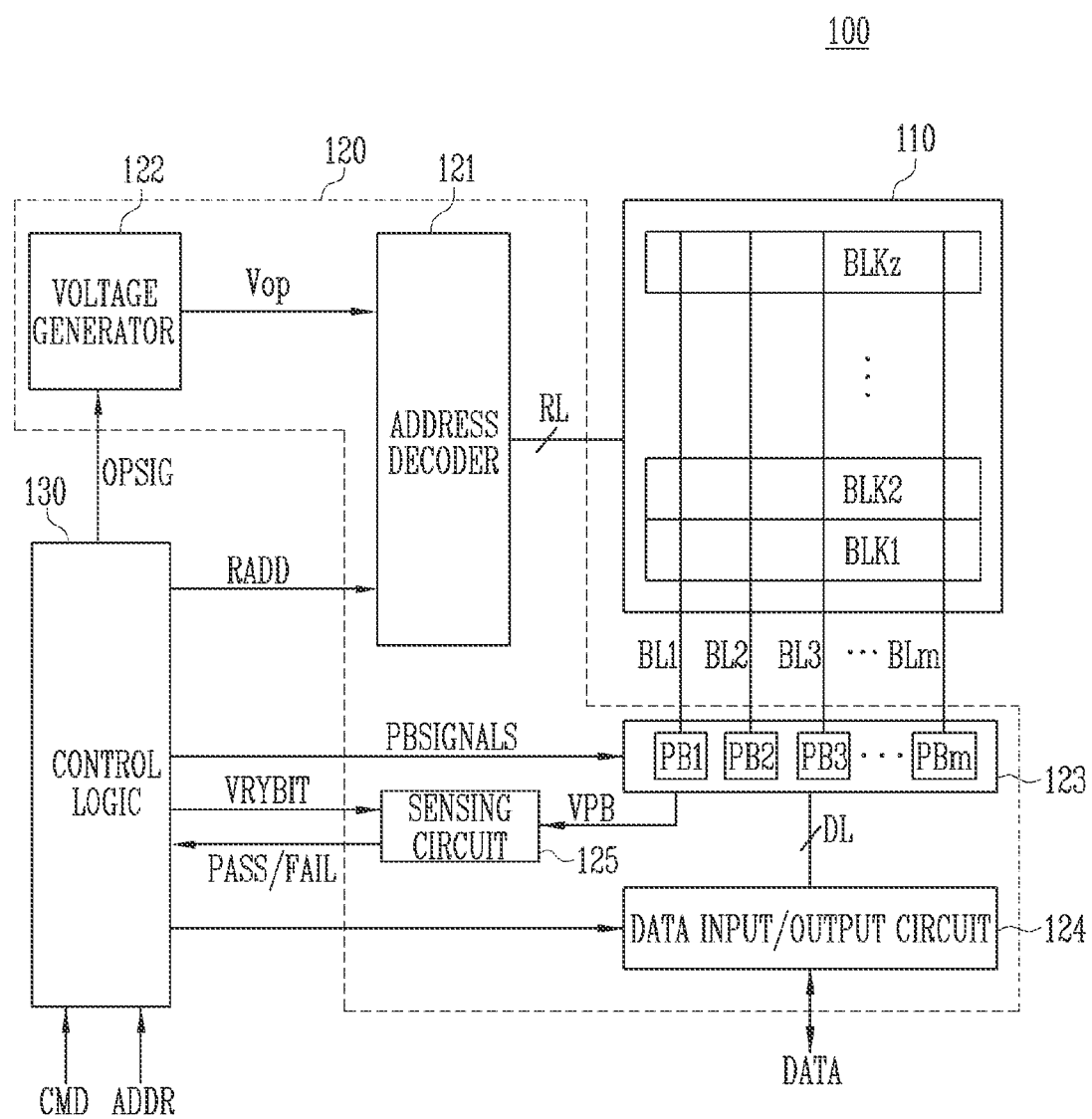
FIG. 11 is a diagram illustrating the structure of a memory device of FIG. 1 according to an embodiment of the present disclosure.

FIG. 11 is a diagram illustrating the structure of the memory device of FIG. 1 according to an embodiment of the present disclosure.

Referring to FIG. 11, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz may be coupled to an address decoder 121 through row lines RL. The memory blocks BLK1 to BLKz are coupled to a page buffer group 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. That is, the memory cell array 110 may include a plurality of pages. In an embodiment of the present disclosure, each of the memory blocks BLK1 to BLKz included in the memory cell array 110 may include a plurality of dummy cells. For the dummy cells, one or more dummy cells may be coupled in series between a drain select transistor and the memory cells, and between a source select transistor and the memory cells.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The peripheral circuit 120 may drive the memory cell array 110. In an example, the peripheral circuit 120 may drive the memory cell array 110 so that a program operation, a read operation, and an erase operation are performed under the control of the control logic 130. In other examples, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address RADD, among the received addresses ADDR. The address decoder 121 may select at least one word line WL of the selected memory block by applying voltages supplied from the voltage generator 122 to the at least one word line WL according to the decoded row address RADD.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to unselected word lines.

During a read operation, the address decoder 121 may apply a read voltage to the selected word line and apply a read pass voltage having a level higher than that of the read voltage to unselected word lines.

The erase operation of the memory device 100 is performed on a memory block basis. During the erase operation, the addresses ADDR input to the memory device 100 include a block address. The address decoder 121 may decode the block address and select one memory block according to the decoded block address. During the erase operation, the address decoder 121 may apply a ground voltage to word lines coupled to the selected memory block.

The address decoder 121 may decode a column address, among the received addresses ADDR. The decoded column address may be transferred to the page buffer group 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 may be used as an operating voltage for the memory device 100.

In an embodiment, the voltage generator 122 may generate various operating voltages Vop that are used for program, read, and erase operations in response to an operation signal OPSIG. The voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The page buffer group 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm may transmit/receive data DATA to/from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in the selected page are programmed based on the received data DATA. Memory cells coupled to a bit line to which a program-enable voltage (e.g., a ground voltage) is applied may have increased threshold voltages. The threshold voltages of memory cells coupled to a bit line to which a program-inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the page buffer group 123 may read data DATA from the memory cells in the selected page through the bit lines BL1 to BLm, and may store the read data DATA in the first to m-th page buffers PB1 to PBm.

During an erase operation, the page buffer group 123 may allow the bit lines BL1 to BLm to float. In an embodiment, the page buffer group 123 may include a column select circuit.

In an embodiment, while pieces of data stored in some of the plurality of page buffers included in the page buffer group 123 are being programmed to the memory cell array 110, the remaining page buffers may receive new data from the memory controller 200 and then store the new data.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the page buffer group 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the page buffer group 123 with a reference voltage generated by the reference current. In an example, the sensing circuit 125 may output a pass signal to the control logic 130 when the magnitude of the sensing voltage VPB is less than that of the reference voltage. In another example, the sensing circuit 125 may output a fail signal to the control logic 130 when the magnitude of the sensing voltage VPB is less than that of the reference voltage.

The control logic 130 may be coupled to the address decoder 121, the voltage generator 122, the page buffer group 123, the data input/output circuit 124, and the sensing circuit 125. The control logic 130 may control the overall operation of the memory device 100. The control logic 130 may be operated in response to a command CMD transferred from an external device.

The control circuit 130 may control the peripheral circuit 120 by generating various types of signals in response to the command CMD and the addresses ADDR. For example, the control logic 130 may generate the operation signal OPSIG, the row address RADD, page buffer control signals PBSIGNALS, and the enable bit VRYBIT in response to the command CMD and the addresses ADDR. The control logic 130 may output the operation signal OPSIG to the voltage generator 122, may output the row address RADD to the address decoder 121, may output the page buffer control signals PBSIGNALS to the page buffer group 123, and may output the enable bit VRYBIT to the sensing circuit 125. In addition, the control logic 130 may determine whether a verify operation has passed or failed in response to the pass or fail signal PASS or FAIL output from the sensing circuit 125.

Figure 12:
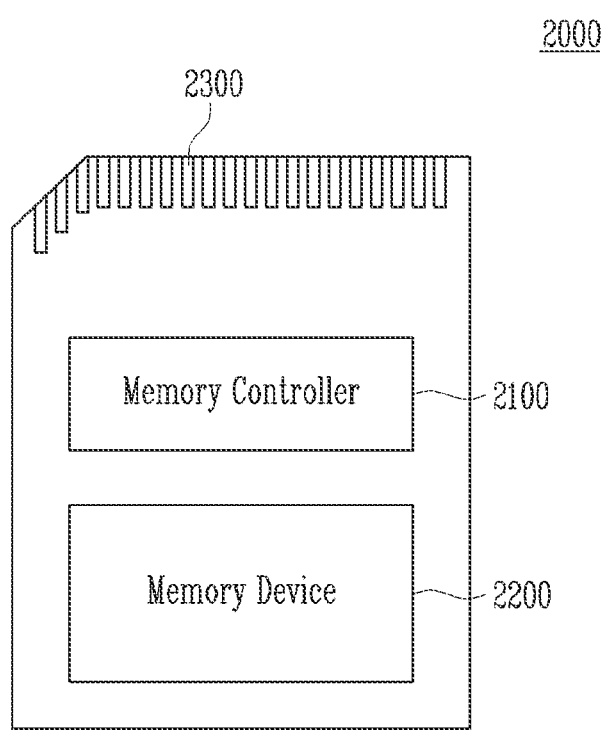
FIG. 12 is a block diagram illustrating a memory card system to which a memory system according to an embodiment of the present disclosure is applied.

FIG. 12 is a block diagram illustrating a memory card system to which a memory system according to an embodiment of the present disclosure is applied.

Referring to FIG. 12, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1. The memory device 2200 may be implemented in the same manner as the memory device 100, described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication standard or interface. In an embodiment, the memory controller 2100 may communicate with the external device through at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe). In an embodiment, the connector 2300 may be defined by at least one of the above-described various communication standards or interfaces.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Transfer Torque magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 13:
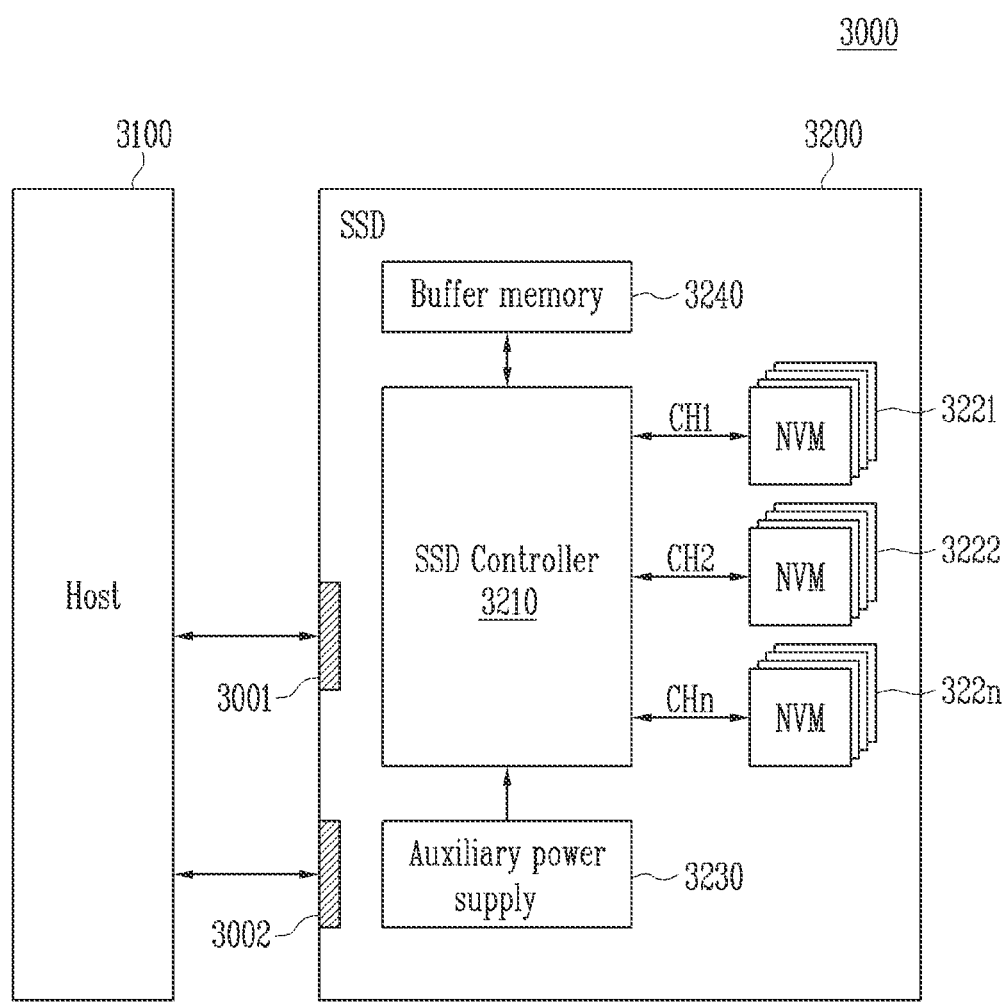
FIG. 13 is a block diagram illustrating a solid state drive (SSD) system to which a memory system according to an embodiment of the present disclosure is applied.

FIG. 13 is a block diagram illustrating a solid state drive (SSD) system to which a memory system according to an embodiment of the present disclosure is applied.

Referring to FIG. 13, an SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memories 3221 to 322$n$, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322$n$ in response to the signals received from the host 3100. In an embodiment, the signals may be signals based on the interfaces of the host 3100 and the SSD 3200. For example, the signals may be signals defined by at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power from the host 3100 and may be charged. The auxiliary power supply 3230 may supply the power to the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$ or may temporarily store metadata (e.g., mapping tables) of the flash memories 3221 to 322$n$. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 14:
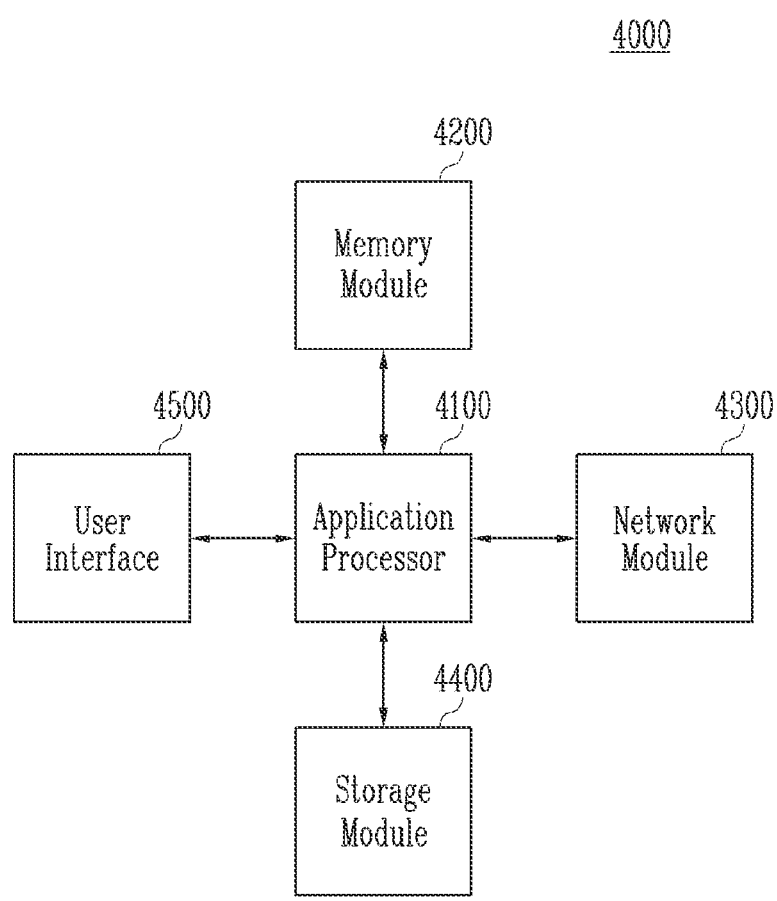
FIG. 14 is a block diagram illustrating a user system to which a memory system according to an embodiment of the present disclosure is applied.

FIG. 14 is a block diagram illustrating a user system to which a memory system according to an embodiment of the present disclosure is applied.

Referring to FIG. 14, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same manner as the memory device 100 described above with reference to FIG. 1. The storage module 4400 may be operated in the same manner as the memory system 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller that is capable of preventing data loss in a sudden power-off situation and a method of operating the memory controller.

The embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller, comprising:
a plurality of control cores configured to control a plurality of memory devices, respectively;
a host core configured to allocate write requests received from a host to each of the plurality of control cores based on predefined criteria; and
a shared memory configured to be accessed by the host core and the plurality of control cores,
wherein the host core is further configured to store, in the shared memory in response to occurrence of a sudden power-off, dump information including information about logical addresses corresponding to the write requests, and
wherein a first control core is further configured to store, in a memory device controlled by the first control core, the dump information of a second control core associated with the first control core in response to occurrence of the sudden power-off, the first and second control cores being among the plurality of control cores.

2. The memory controller according to claim 1, wherein the host core allocates the write requests to the first control core less frequently than the second control core.

3. The memory controller according to claim 2, wherein:
each of the plurality of control cores is further configured to store, in the shared memory, milestone information indicating processing states of write requests allocated thereto, and
the first control core stores the dump information of the second control core in the memory device controlled by the first control core based on milestone information of the second control core.

4. The memory controller according to claim 3, wherein the first control core is further configured to store, in the memory device, pieces of data corresponding to the write requests allocated to the first control core, and identify the milestone information of the second control core after a preset time has elapsed since the occurrence of the sudden power-off.

5. The memory controller according to claim 4, wherein each of the plurality of control cores is further configured to update the milestone information when processing of each of the allocated write requests is completed, and the first control core stores the dump information of the second control core in the memory device unless the milestone information of the second control core is updated, until the preset time has elapsed.

6. The memory controller according to claim 5, wherein the first control core stores the dump information of the second control core and dump information of a third control core associated with the first control core in the memory device based on the milestone information of the second control core and milestone information of the third control core.

7. The memory controller according to claim 5, wherein the milestone information includes a plurality of sequences indicating extents to which the allocated write requests are processed by each of the plurality of control cores, and each of the plurality of control cores updates the milestone information whenever each of the plurality of sequences is completed by the control core.

8. The memory controller according to claim 7, wherein the first control core stores, in the memory device, the dump information corresponding to pending sequences other than the completed sequences, among the plurality of sequences of the second control core.

9. The memory controller according to claim 5, wherein:

external auxiliary power is supplied to the memory controller in response to the occurrence of the sudden power-off, and an interval of the preset time is shorter than an interval from the occurrence of the sudden power-off to a time at which the external auxiliary power is turned off.

10. A method of operating a memory controller including a plurality of control cores for individually controlling a plurality of memory devices, the method comprising:

allocating write requests received from a host to each of the plurality of control cores based on predefined criteria;

storing, in a shared memory in response to occurrence of a sudden power-off, dump information including information about logical addresses corresponding to the write requests; and storing, in a memory device controlled by a first control core, the dump information of a second control core associated with the first control core in response to occurrence of the sudden power-off, the first and second control cores being among the plurality of control cores.

11. The method according to claim 10, further comprising storing, in the shared memory, milestone information indicating processing states of write requests allocated to each of the plurality of control cores, wherein the dump information of the second control core is stored in the memory device based on the milestone information.

12. The method according to claim 11, further comprising:

storing, in the memory device, pieces of data corresponding to write requests allocated to the first control core, and identifying the milestone information of the second control core after a preset time has elapsed since the occurrence of the sudden power-off.

13. The method according to claim 12, further comprising updating the milestone information when processing of write requests allocated to each of the plurality of control cores is completed, wherein the dump information of the second control core is stored in the memory device unless the milestone information of the second control core is updated, until the preset time has elapsed.

14. The method according to claim 13, wherein, after the dump information of the second control core is stored in the memory device, milestone information of a third control core associated with the first control core, among the plurality of control cores, is identified, and dump information of the third control core is stored in the memory device based on the milestone information of the third control core.

15. The method according to claim 13, wherein the milestone information includes a plurality of sequences indicating extents to which write requests allocated to each of the plurality of control cores are processed by each of the plurality of control cores, and the milestone information is updated whenever each of the plurality of sequences is completed by the control core.

16. The method according to claim 15, wherein the storing the dump information of the second control core in the memory device comprises storing, in the memory device, the dump information corresponding to pending sequences other than the completed sequences, among the plurality of sequences of the second control core.

17. A memory controller, comprising:

a plurality of control cores configured to individually control a plurality of memory devices;

a host core configured to allocate write requests received from a host to each of the plurality of control cores based on predefined criteria; and a shared memory configured to be accessed by the host core and the plurality of control cores, wherein, in response to occurrence of a sudden power-off, the host core stores dump information including information about logical addresses corresponding to the write requests in the shared memory, and each of the plurality of control cores stores data corresponding to allocated write requests and dump information of paired control cores respectively associated with the plurality of control cores in the plurality of memory devices.

18. The memory controller according to claim 17, wherein each of the plurality of control cores stores milestone information, indicating whether data corresponding to the allocated write requests is stored, in the shared memory, and stores dump information of the paired control cores in the plurality of memory devices based on the milestone information.

19. The memory controller according to claim 18, wherein the plurality of control cores read dump information of the paired control cores in response to a power-on state, and provide the read dump information to the host.

* * * * *